Feb. 4, 1936.  R. THOMSON  2,029,514

THREAD CUTTING TOOL

Filed April 25, 1934

INVENTOR
Robert Thomson
BY
ATTORNEYS

Patented Feb. 4, 1936

2,029,514

UNITED STATES PATENT OFFICE 2,029,514

THREAD CUTTING TOOL

Robert Thomson, Arlington, N. J., assignor to Dardelet Threadlock Corporation, New York, N. Y., a corporation of Delaware Application April 25, 1934, Serial No. 722,287

1 Claim. (Cl. 10—141)

An important object of the present invention is to provide a tap of improved design for cutting Dardelet internal screw threads.

Another object of the invention is to provide a tap to cut a complete Dardelet thread in a single operation and having thread groove cutters and thread crest trimmers in an improved arrangement and correlation to reduce working strain upon the tap and to enable a quite small Dardelet thread to be cut with accuracy in refractory materials having a tendency to bind and clog the tap.

Other objects of the invention will appear hereinafter.

Figure 1:
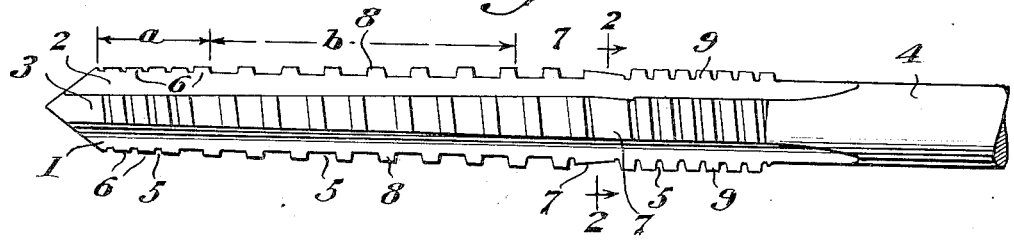
Figure 2:
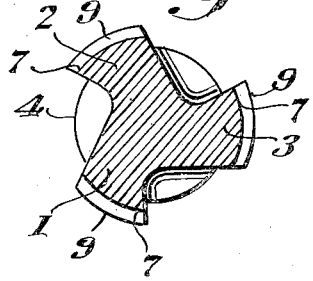
Figure 3:
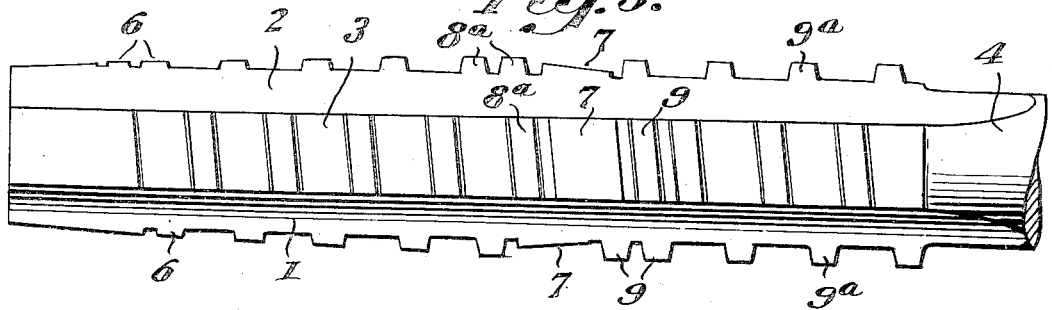

In the drawing, Fig. 1 is a side view of the improved tap in one of its forms;

Fig. 2 an enlarged transverse sectional view approximately on the line 2—2 of Fig. 1;

Fig. 3 a side view of the improved tap in a modified form; and

Figure 4:
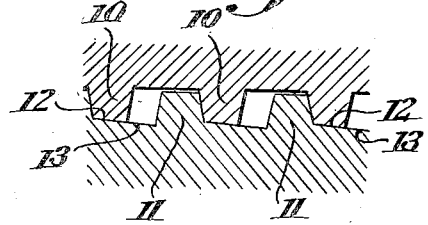

Fig. 4 a fragmentary longitudinal sectional view on an enlarged scale, showing a Dardelet internal thread and a Dardelet external thread in mutual locking engagement.

The tap illustrated in Figs. 1 and 2 is fluted to provide preferably three lands, numbered 1, 2 and 3. At its entering end the tap tapers to a point. From said end taper the tap is tapered for a length "$a$". It is also tapered to a less degree along a following length "$b$". The number of tapered lengths and the degree of taper may be varied, however. The tap has the usual cylindrical shank 4.

Upon the tap lands there are thread groove cutting teeth, thread crest trimmers and thread finishing and guiding teeth all in an improved arrangement and correlation. To form the teeth, a helical groove 5 is cut in the tap along the entire working length of the latter. Except for the points where the crest trimmers occur on the lands, the bottom of the groove is straight in cross section and is parallel with and equidistant from the tap axis at all points. The groove cutting teeth and the finishing and guiding teeth are all of the same width at the base or root. The depth of the cutting teeth, however, increases progressively along the taper lengths "$a$" and "$b$" to gradually increase the depth of the thread groove cut by the tap. Following the length "$b$" all of the groove finishing and guide teeth on the lands are of the same depth and their top edges are straight in cross section and parallel with and equidistant from the axis of the tap. The side faces of all the teeth converge outward slightly.

From the entering end of the tap, inward along the turns of the helix included in the length "$a$", the teeth occur in uninterrupted helical sequence on the successive lands. These leading or pilot teeth are designated 6. Between the teeth 6 the groove 5 is of materially less width than the teeth. Along the following length of the tap up to the crest trimmers 7, the teeth occur in interrupted helical sequence, a tooth being omitted from every alternate land around the tap and along the helix. Consequently along this medial length of the tap the groove is much wider. The interrupted teeth are designated 8. The crest trimmers 7 follow the teeth 8. They are in the form of wide shallow teeth having straight cutting edges at the top, inclined slightly with reference to the tap axis. Preferably the inclination is six degrees. Each land has one crest trimmer and the trimmers are arranged in a helical path parallel with that of the two series of groove cutting teeth 6 and 8. They are formed by grinding down each land on a six degree taper with an angled grinding wheel of sufficient thickness to span the width of two adjacent groove cutting teeth. The grinding is continued until the medial, active portions of teeth 7 extend across a theoretical prolongation of the bottom line of groove 5.

The crest trimmers may increase progressively in depth, or, the third trimmer, or both the second and third trimmers may be of the same depth as the first trimmer to smooth and burnish the third crest and to function in practice, upon dulling or mutilation of the preceding trimmer, to finish the trimming operation.

Following the crest trimmers are the tap guiding teeth 9 which may also serve to finish the thread groove if the groove has not been finished by the teeth preceding the crest trimmers. The teeth 9 occur in uninterrupted sequence on the lands in succession and they lie on a prolongation of the helical path of the teeth 6 and 8. All of the teeth 6, 7, 8, and 9 may be formed with a suitable top relief.

A pair of mutually self-locked Dardelet threads is shown in section in Fig. 4. The internal and external threads are designated 10 and 11 respectively. The crest surface of the thread 10 is inclined to the axial line at an angle of six degrees to form the self-holding binding surface 12 which wedges upon a similarly inclined bottom surface 13 of the bolt thread groove, upon screw-tightening rotation of one thread on the other without axial advance, as more fully explained in the United States patent to Dardelet No.

1,657,244. It is important that the crest size of the rib of the thread 10 actually cut by a tap shall conform accurately with the standard which the tap is designed to cut, that the angle of the crest surface shall be accurate and that the crest surface shall be smooth.

Heretofore it has been difficult and often impossible to tap small Dardelet threads in copper, open hearth steel, or materials having the characteristics of wrought iron. Such materials tend to contract and bind the tap and also to clog it. A slender tap for tapping very small holes would frequently break in two under the resistance offered by such metals. Or, the teeth of the tap and the thread being cut would often become mutilated so that the thread would be unfit to cooperate with a complementary thread for self-locking.

The improved tap has been designed to tap small holes in said refractory materials without dangerous strain upon the tap. The tap is employed to tap a hole whose diameter slightly exceeds that of the helix on which the bottom of the tap groove 5 lies, so that no cutting will be performed by the edges of the groove bottom on the lands. The leading end of the tap is inserted into the hole and the uninterrupted pilot teeth 6 accurately center the tap with relation to the hole and perform the initial groove cutting. As the tap advances relatively through the hole the depth of the groove is gradually increased and the groove cutters 8 come into action. Due to the interrupted sequence of the cutters 8 the working contact of the tap with the hole is cut in half and increased clearance is afforded for escape of chips. Consequently binding and clogging strain upon the tap is greatly reduced and breaking of the tap and mutilation of its teeth is prevented. The groove cutting teeth preserve their correct profile so that they are able to produce an accurate thread rib for presentation to the crest trimmers which immediately follow the groove cutters. The thread rib arrives at the crest trimmers in an unmutilated state so that an effective locking surface of full width can be produced by the trimmers.

The tap shown in Fig. 5 is designed more especially for tapping somewhat larger holes. This tap has a blunt leading end and a single taper which is sufficient to eliminate some of the uninterrupted pilot teeth 6. Also, this tap is designed for a more balanced support of the tap to hold it accurately centered at opposite sides of the crest trimmers 7. To this end the interrupted sequence of the groove cutting teeth terminates short of the crest trimmers and several teeth 8ª occur close together in uninterrupted sequence directly in advance of the crest trimmers. Directly following the crest trimmers there are also several of the guiding teeth 9 in uninterrupted sequence or close together to cooperate with the teeth 8ª in centering and supporting the tap at opposite sides of the crest trimming operation. The following teeth 9ª occur in interrupted sequence to reduce frictional contact of the tap with the work. Except for the modifications described this tap is like the one first described.

What I claim is:

A tap for cutting Dardelet internal screw threads, characterized in that said tap has a body threaded and fluted to provide lands with a helical series of thread groove cutting teeth in interrupted sequence on the lands in succession around the tap to reduce strain one the tap, a helical series of thread groove cutting teeth in uninterrupted sequence immediately following said interrupted teeth, a helical series of thread crest trimmers immediately following said uninterrupted teeth and having cutting edges inclined slightly toward the tap axis longitudinally of the tap, the land surfaces at and between the bases of all of the groove cutting teeth on the lands in advance of said crest trimmers being nearer the tap axis than said crest-trimming edges to avoid all crest-trimming action in advance of said crest trimmers, a helical series of groove-entering guide teeth in uninterrupted sequence immediately following said crest trimmers, and a helical series of groove-entering guide teeth in interrupted sequence immediately following said uninterrupted guide teeth.

ROBERT THOMSON.